(12) United States Patent
Huang et al.

(10) Patent No.: US 10,929,110 B2
(45) Date of Patent: Feb. 23, 2021

(54) AI-ASSISTED UX DESIGN EVALUATION

(71) Applicant: INTERNATIONAL BUSINESS MACHINES CORPORATION, Armonk, NY (US)

(72) Inventors: Lei Huang, Mountain View, CA (US); Shun Jiang, San Jose, CA (US); Peifeng Yin, San Jose, CA (US); Aly Megahed, San Jose, CA (US); Eric Liu, San Jose, CA (US); Guangjie Ren, Belmont, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/442,497

(22) Filed: Jun. 15, 2019

(65) Prior Publication Data

US 2020/0394026 A1    Dec. 17, 2020

(51) Int. Cl.
*G06F 9/44* (2018.01)
*G06F 8/38* (2018.01)
*G06N 20/00* (2019.01)
*G06F 8/20* (2018.01)
*G06F 9/451* (2018.01)

(52) U.S. Cl.
CPC .............. *G06F 8/38* (2013.01); *G06F 8/20* (2013.01); *G06F 9/451* (2018.02); *G06N 20/00* (2019.01)

(58) Field of Classification Search
CPC .................................. G06F 8/38; G06N 20/00
USPC ........................................................ 717/105
See application file for complete search history.

(56) References Cited

U.S. PATENT DOCUMENTS

| 8,204,838 B2 | 6/2012 | Schwaighofer et al. |
| 8,257,091 B2 * | 9/2012 | Couch ..................... G09B 7/00 434/322 |
| 8,806,444 B1 * | 8/2014 | Podgorny ........... G06F 11/3452 717/127 |

(Continued)

FOREIGN PATENT DOCUMENTS

CN          105843608 A       8/2016

OTHER PUBLICATIONS

Dieter P. Wallach et al.; "Predictive Prototyping for Real-World Applications"—A model-based evaluation approach based on the ACT-R cognitive architecture. DIS '19, Jun. 23-28, 2019, San Diego, CA, USA.*

(Continued)

*Primary Examiner* — Francisco J Aponte
(74) *Attorney, Agent, or Firm* — Intelletek Law Group, PLLC; Gabriel Daniel, Esq.

(57) ABSTRACT

A method and system of evaluating a user experience (UX) design are provided. A UX design is received. All objects that are identified to be part of a background of the input UI screen are removed to create a filtered input UI screen. The input UI screen is assigned to a cluster. A target UI screen of the input screen is determined and its background removed, to create a filtered target UI cluster. The target UI screen is assigned to a cluster. The filtered input UI screen is used as an input to a deep learning model to predict a target UI cluster. The predicted target UI cluster is compared to the filtered target UI cluster based on the clustering. Upon determining that the filtered target UI cluster is similar to the target UI screen, the UX design is classified as being successful.

19 Claims, 11 Drawing Sheets

(56) References Cited

U.S. PATENT DOCUMENTS

| | | | |
|---|---|---|---|
| 9,727,438 B2 | 8/2017 | Buxbaum et al. | |
| 10,168,998 B2 | 1/2019 | Shack et al. | |
| 10,387,787 B1* | 8/2019 | Cessna | G06N 5/02 |
| 10,481,751 B2* | 11/2019 | Sharon | G06F 3/0481 |
| 10,540,683 B2* | 1/2020 | Gao | G06N 5/003 |
| 10,621,597 B2* | 4/2020 | Mascaro | G06N 20/00 |
| 10,629,086 B2* | 4/2020 | Chetlur | G06F 9/451 |
| 10,783,149 B2* | 9/2020 | Osotio | G06Q 10/10 |
| 2013/0159228 A1* | 6/2013 | Meijer | G06N 20/00 706/14 |
| 2015/0019173 A1 | 1/2015 | Amid et al. | |
| 2016/0231911 A1* | 8/2016 | Godsey | G06F 3/0481 |
| 2017/0249549 A1* | 8/2017 | Bai | G06K 9/00771 |
| 2017/0300567 A1 | 10/2017 | Jehan et al. | |
| 2017/0308960 A1* | 10/2017 | Mascaro | G06N 20/20 |
| 2018/0011918 A1* | 1/2018 | Mouen | G06F 16/285 |
| 2018/0247222 A1* | 8/2018 | Tolomei | G06N 20/20 |
| 2018/0359648 A1 | 12/2018 | Savalle et al. | |
| 2018/0364879 A1* | 12/2018 | Adam | G06F 3/0484 |
| 2018/0365025 A1* | 12/2018 | Almecija | G06F 9/451 |
| 2019/0179953 A1* | 6/2019 | Kline | G06F 16/9535 |
| 2019/0244092 A1* | 8/2019 | Baughman | G06N 7/005 |
| 2019/0250891 A1* | 8/2019 | Kumar | G06F 8/35 |
| 2019/0310867 A1* | 10/2019 | Edge | G06F 3/0481 |
| 2019/0347144 A1* | 11/2019 | Chen | G06F 9/541 |
| 2020/0019420 A1* | 1/2020 | Saimani | G06N 5/04 |
| 2020/0019628 A1* | 1/2020 | Chen | G06F 16/50 |
| 2020/0125635 A1* | 4/2020 | Nuolf | G06F 9/451 |
| 2020/0133444 A1* | 4/2020 | Hou | G06F 3/0481 |
| 2020/0133644 A1* | 4/2020 | Hou | G06F 40/14 |
| 2020/0133693 A1* | 4/2020 | Rohde | G06F 16/2455 |
| 2020/0134388 A1* | 4/2020 | Rohde | G06N 20/00 |
| 2020/0134489 A1* | 4/2020 | Achin | G06N 20/00 |
| 2020/0134637 A1* | 4/2020 | Srinivasan | G06F 40/174 |
| 2020/0160229 A1* | 5/2020 | Atcheson | G06N 5/02 |
| 2020/0274784 A1* | 8/2020 | Sharma | H04L 41/046 |
| 2020/0311204 A1* | 10/2020 | Gupta | G06F 40/30 |

OTHER PUBLICATIONS

Ziming Wu et al.; "Predicting and Diagnosing User Engagement with Mobile UI Animation via a Data-Driven Approach"; CHI 2020, Apr. 25-30, 2020, Honolulu, HI, USA.*

IBM et al., "Methods and Technique for Mining UI Patterns"; IP.com (2007) No. IPCOM000157083D; 5 pgs.

Mell, P. et al., "Recommendations of the National Institute of Standards and Technology"; NIST Special Publication 800-145 (2011); 7 pgs.

* cited by examiner

AI-ASSISTED UX DESIGN EVALUATION

BACKGROUND

Technical Field

The present disclosure generally relates to computer systems, and more particularly, to an automated evaluation of a user interface design.

Description of the Related Art

User experience (UX) design is the process of enhancing user gratification with a product by improving the usability, accessibility, and desirability provided in the interaction with a product. User experience design encompasses traditional human-computer interaction (HCI) design, and extends it by addressing all aspects of a product or service as perceived by users, including the user interface of the product.

SUMMARY

According to various embodiments, a computing device, a non-transitory computer readable storage medium, and a method are provided for evaluating a user experience (UX) design. A UX design is received and objects of an input user interface (UI) screen of the UX design are identified. All objects that are identified to be part of a background of the input UI screen are removed to create a filtered input UI screen. The input UI screen is assigned to a cluster. A target UI screen of the input screen is determined. All objects that are identified to be part of a background are removed of the target UI screen to create a filtered target UI screen. The target UI screen is assigned to a cluster. The filtered input UI screen is used as an input to a deep learning model to predict a target UI cluster. The predicted target UI cluster is compared to the filtered target UI cluster based on the clustering. Upon determining that the filtered target UI cluster is similar to the target UI screen, the UX design is classified as being successful.

In one embodiment, the deep learning model is a sequential model.

In one embodiment, the similarity between the filtered target UI cluster and the filtered target UI cluster is based on a confidence score being at or above a predetermined threshold. Upon determining that the confidence score is below the predetermined threshold, the UX design can be classified as ineffective. The UX design may then be prevented from being available to an audience.

In one embodiment, a sequential UX flow evaluation of the UX design is performed.

In one embodiment, the filtered input UI screen includes a first feature vector, the filtered target UI screen includes a second feature vector, and the comparison is based on a comparison of the first feature vector to the second feature vector.

In one embodiment, the deep learning model is created by the computing device during a preliminary phase, where a weighted flow graph of clustering nodes is created based on historical data of successful UX designs. Historical user interaction logs between users and UX designs are received. The weighted flow graph and the user interaction logs are combined to create paths. These paths are used to train the deep learning model. The deep learning model may be a sequential model. Long short-term memory (LSTM) may be used by the sequential model.

In one embodiment, edges between the clustering nodes of the weighted flow graph are weighted based on a probability of transition between the clustering nodes.

According to various embodiments, a computing device, a non-transitory computer readable storage medium, and a method are provided for evaluating a UX design. A UX design is received and objects of an input user interface (UI) screen of the UX design are identified. A user experience UX design is received that includes a sequence of user interface screens. For each UI screen of the UX design, objects of the UI screen are identified. All objects that are identified to be part of a background of the UI screen are removed to create a filtered input UI screen. The filtered input UI screen is assigned to a cluster. A sequence of the clusters is created. A target UI screen of the sequence of clusters is determined. All objects that are identified to be part of a background of the target UI screen are removed to create a filtered target UI cluster. The sequence of the clusters is used as an input to a deep learning model to predict a target UI cluster. The predicted target UI cluster is compared to the filtered target UI cluster. Upon determining that the filtered target UI cluster is similar to the target UI screen, the UX design is classified as being successful.

In one embodiment, the learning model is a many to one sequential deep learning model.

In one embodiment, the similarity between the filtered target UI cluster and the filtered target UI cluster is based on a confidence score being at or above a predetermined threshold. Upon determining that the confidence score is below the predetermined threshold, the UX design may be classified as ineffective. The UX design may then be prevented from being available to an audience.

In one embodiment, the filtered input UI screen includes a first feature vector, the filtered target UI screen includes a second feature vector, and the comparison is based on a comparison of the first feature vector to the second feature vector.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

The present disclosure generally relates to systems and computerized methods of automatically evaluating a UX design. In recent years, the understanding of human behavior and its interaction with his or her environment have been an active area of research. A good UX design provides an effortless and enjoyable experience for the user, thereby improving the acceptance, usability, and ultimate success of the product behind the design. To determine the effectiveness of a UX design, traditional approaches included A/B testing, conducting surveys, expert evaluations, user workshops and evaluations, etc., or a combination thereof. For example, A/B testing typically involves a randomized experiment with two variants (e.g., A and B, where A can be an old version and B a new version). It includes application of statistical hypothesis testing or "two-sample hypothesis testing." A/B testing provides a way to compare two versions of a single variable, typically by testing a subject's response to variant A against variant B, and determining which of the two variants is more effective based on predetermined criteria. As to surveys, it typically involves a list of questions directed at determining data from a group of people. The aforementioned known approaches for evaluating the UX design have various limitations. Such approaches generally are inefficient in time, involve a high cost, may be biased, are difficult to quantify, may be incomprehensible (e.g., the criteria for evaluation may not be known), and the knowledge gained therefrom may not be readily transferred to other platforms.

Accordingly, in one embodiment, what is provided herein is an evaluation of a UX design based on graph theory and sequential deep learning modeling. The UX design evaluation approaches discussed herein may involve three levels of evaluation of a UX Design to provide a confidence score thereof, including (i) UI object evaluation, (ii) UI screen pair transition logic evaluation, and (iii) sequential UX flow evaluation. Each of these evaluations are discussed in detail below. Reference now is made in detail to the examples illustrated in the accompanying drawings and discussed below.

Example Architecture

Figure 1:
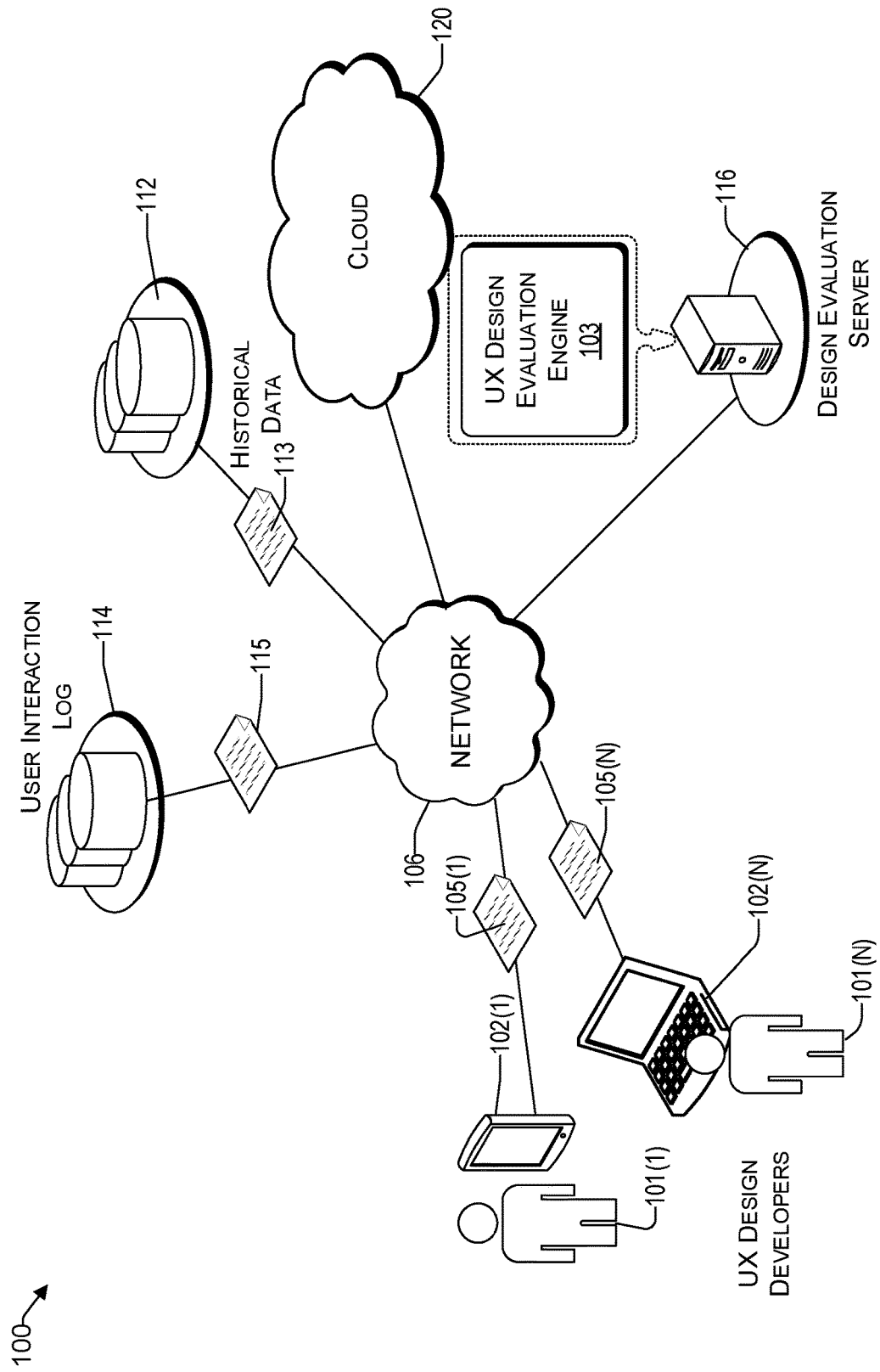
FIG. 1 illustrates an example architecture of a user experience design evaluation system.

FIG. 1 illustrates an example architecture 100 of a user experience (UX) design evaluation system. Architecture 100 may include one or more UX design developers 101(1) to 101(N) who create UX design 105(1) to 105(N) that can be experienced on various computing devices 102(1) to 102(N). The architecture 100 may further include a historical data repository 112 operative to provide historical data 113, as well as a user interaction log database 114 operative to provide historical user interaction data 115.

The architecture 100 includes a design evaluation server 116 that hosts a UX design evaluation engine 103. There is a network that 106 allows the UX design evaluation engine 103 to communicate with various resources connected to the network 106, such as the historical data repository 112, user interaction log database 114, and UX design developers 101(1) to 101(N). The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet, that provides various ancillary services, such as communication with various databases, potential participants, the Internet, and the cloud 120.

For discussion purposes, different user devices appear in the drawing, to represent some examples of the client devices that may be used by a user to experience various screens of a UX design. Today, user devices typically take the form of portable handsets, smart-phones, tablet computers, personal digital assistants (PDAs), and smart watches, although they may be implemented in other form factors, including consumer, medical, and business electronic devices. Such user devices, as well as others, may be used as an interface to experience a UX design.

The historical data repository 112 is configured to store and maintain a large set of historical data 113, sometimes referred to as massive data, which includes data related to various UX design's that are deemed to be effective (e.g., resulting in a satisfactory completion of an inquiry or transaction, such as a purchase of an online product). Similarly, the user interaction log database 114 stores data of user behavior interacting with various UX design's that are deemed to be successful.

The UX design 103 is configured to receive the historical data 113 and the user interaction log data 115 over the network 106 to created a weighted flow graph, discussed in more detail later. In one embodiment, the data 115 provided by the user interaction log database 114, together with the historical data 113, collectively serve as a corpus of data from which the UX design evaluation engine 103 can learn from to create a sequential deep learning model that can then be used to evaluate various new UX designs 105(1) to 105(N).

It will be understood that the sheer volume of historical data 113 and user interaction log data 115 received by the UX design evaluation engine 103 may provide a technical challenge for not only the network 106, but also the computing resources of the design evaluation server 116 hosting the UX design evaluation engine 103, including processing time and memory resources of the design evaluation server 116. In this regard, the UX design evaluation engine 103 is configured to filter out background information of each screen of a UX design. In this way, a technical effect of conserving valuable network resources 106, as well as computing and storage resources of the design evaluation server 116 are achieved. By virtue of limiting the computation to a reduced pool of relevant data, the computational demand on the design evaluation server 116 is conserved, thereby providing a more efficient computational platform.

In one aspect, based on graph theory and/or sequential deep learning model, the teachings herein provide an automatic way to evaluate a UX design (e.g., 105(1)) at three levels: (i) user interface (UI) object, (ii) transition logic between UI screens, and (iii), and sequential UX flow, each of which will be explained in detail below.

While the historical data repository 112, user interaction log database 114, profile database 118, and the design evaluation server 116 are illustrated by way of example to be on different platforms, it will be understood that in different embodiments, these platforms may be combined in various combinations. In other embodiments, one or more of these computing platforms may be implemented by virtual computing devices in the form of virtual machines or software containers that are hosted in the cloud 120, thereby providing an elastic architecture for processing and storage. The cloud is discussed in more detail later.

Example Block Diagrams

Figure 2:
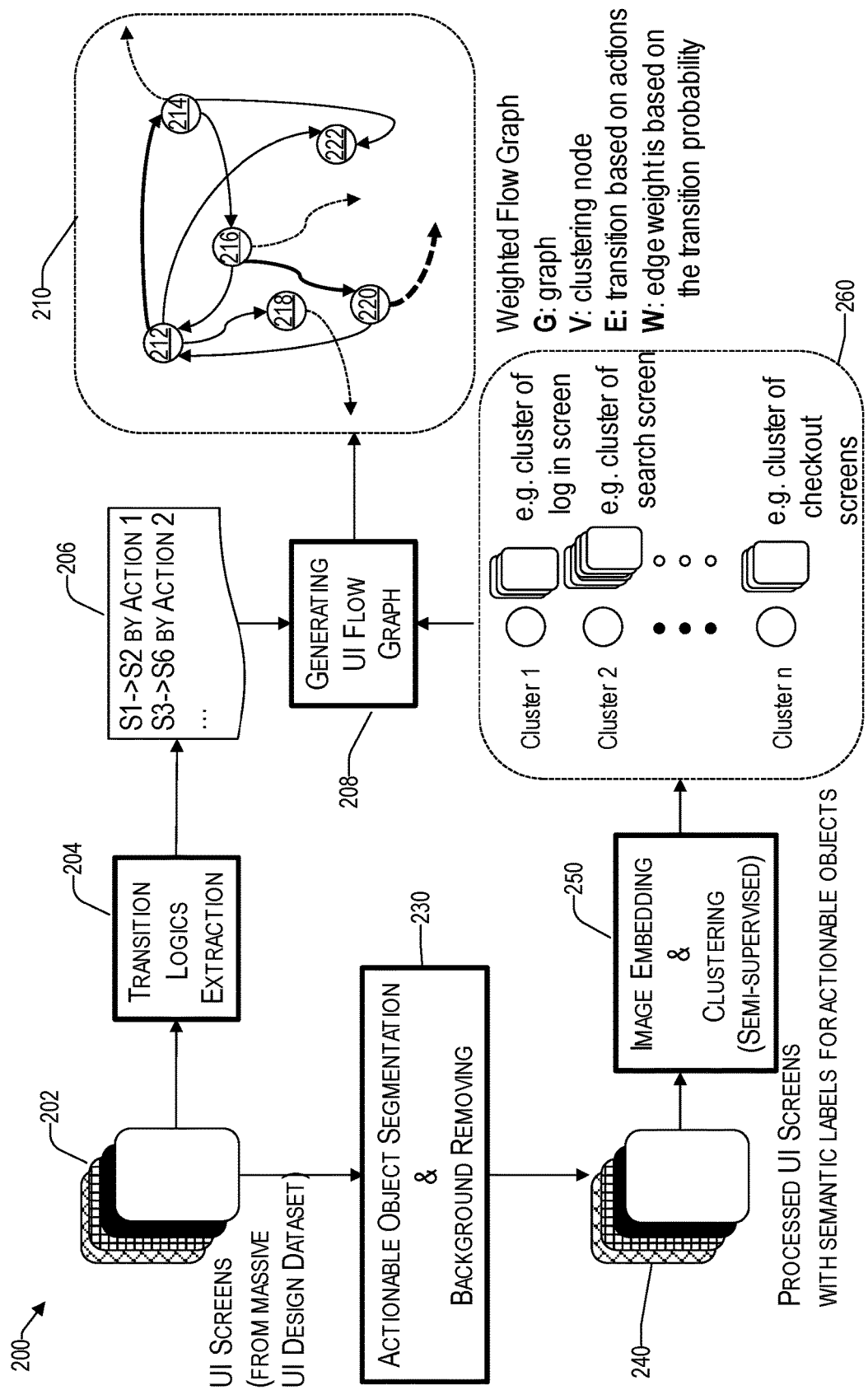
FIG. 2 is a conceptual block diagram of the building of a user interface flow graph, consistent with an illustrative embodiment.

Reference now is made to FIG. 2, which is a conceptual block diagram 200 of the building of a user interface flow graph 210, consistent with an illustrative embodiment. A set of user interface screens 202 may be received from a massive UI design dataset, such as the historical data repository 112 of FIG. 1. For example, the UI screens 202 may be related to successful UX designs that are used as part of a corpus of data to learn from.

At block 204 the transition logic between user interface screens is extracted. For example, as illustrated in block 206, screen 1 may invoke screen 2 by action 1. Screen 2 may invoke screen 6 by action 2. By way of non-limiting example, screen 1 may be a login screen having various actionable objects, such as a username, password, biometric information, etc. The second screen may be a general welcome screen of an online retailer that is tailored for the user account.

Block 230 represents actionable object segmentation and background removal by the UX design evaluation engine 103. As used herein an actionable object is an entity that a user can interact with, such as password entry field, search field, etc. Objects that are not actionable can be classified as background objects. These background objects are removed (i.e., filtered) from the corresponding screens, thereby simplifying the computational complexity for the UX design evaluation engine 103. For example, UI screen segmentation can include detecting boundaries of action objects (e.g., UI items that can trigger a UI screen transition, such as a search, login, clickable button, hyperlink image, etc.). Accordingly, UI screens 240 are processed in that they are filtered from having any objects identified as a background. Further, the actionable objects are semantically labeled in block 240. For example, semantic labeling can be considered as a text label to describe the function of actionable objects in the screen (e.g., the semantic label for a login button can simply be a short text "login." A screen may include multiple actionable objects (e.g., sign in, signup, join as a guest, etc.). In one embodiment, we can detect them by image segmentation and labeling techniques.

At block 250, image embedding and clustering prediction is performed to determine to which cluster a screen belongs to, based on the identified objects therein. In one embodiment, image embedding, sometimes referred to as embedding a UI screen, includes (i) action object segmentation and semantic labelling, (ii) removing background objects, and (iii) generating a feature vector for a UI screen.

Every object has its own special features that helps in classifying it into a corresponding cluster. To that end, in one embodiment, deep learning is used. For example, deep learning may be used herein to construct algorithms that can learn from and make predictions based on the data that may be stored in the historical data repository 112. Such algorithms operate by building a model from stored prior inputs or baselines therefrom in order to make data-driven predictions or decisions (or to provide threshold conditions to indicate whether a screen belongs to a predetermined cluster), rather than following strictly static criteria. Based on the deep learning, patterns and trends are identified, and any outliers identified as not belonging to the cluster.

In various embodiments, the deep learning discussed herein may be supervised or unsupervised. In supervised learning, the UX design evaluation engine 103 may be presented with example data from the historical data repository 112 as data that is related to various categories, respectively. Put differently, the historical data repository 112 acts as a teacher for the UX design evaluation engine 103. In unsupervised learning, the historical data repository 112 does not provide any labels as what is acceptable, rather, it simply provides historic data 113 to the design evaluation server 116, which can be used to find its own structure among the data to identify the correct cluster.

In various embodiments, the deep learning may make use of techniques such as supervised learning, unsupervised learning, semi-supervised learning, naïve Bayes, Bayesian networks, decision trees, neural networks, fuzzy logic models, and/or probabilistic classification models.

Block 260 illustrates each UI screen to be clustered into a corresponding node. For example, one cluster may relate to a log-in screen, another cluster may relate to a search screen, etc. The cluster information of block 260 together with the transition logic between user interface screens of block 206 is used to generate a UI flow graph in block 208. In one embodiment, the flow graph is weighted, as illustrated by block 210.

Referring back to block 208, the UX design evaluation engine 103 generates a user interface flow graph, which may be weighted, as illustrated in block 210. Nodes 212 to 222 of block 210 represent clustering nodes. As used herein, a cluster is an intrinsic grouping that characterizes a function. For example, a function may be, without limitation, a log in screen, search screen, checkout bin, shopping page, search screen, help screen, etc. In some embodiments, the edges, representing the transition between the screens are weighted based on a transition probability. By way of example only, and not by way of limitation, a dotted line may represent a lowest probability, a dashed line a higher probability, a solid line a higher probability than the dashed, and a bold solid line as the highest probability. It will be understood that other graphical representations of the probability of transitioning from one cluster to another, such as color or labels, are within the scope of the present disclosure.

Figure 3:
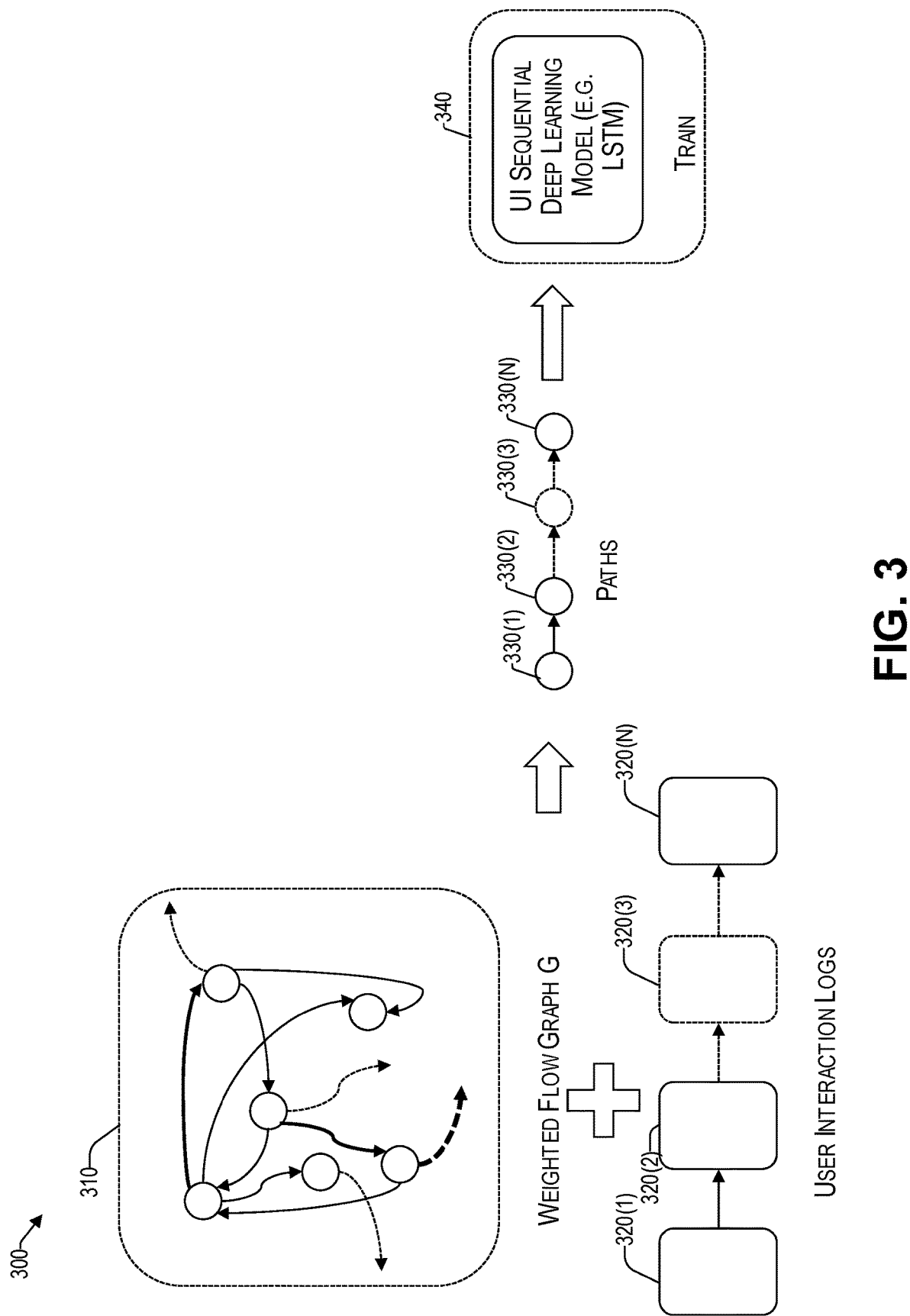
FIG. 3 is a conceptual block diagram of the creation of a deep learning model, consistent with an illustrative embodiment.

FIG. 3 is a conceptual block diagram 300 of the creation of a deep learning model 340, consistent with an illustrative embodiment. For example, block diagram 300 describes how a user interacts with a user interface, such as a website that provides products and/or services. Upon creating a weighted flow graph 310 as discussed herein, the graph is combined with user interaction logs 320(1) to 320(N), which may be received from the user interaction log database 114 of FIG. 1. In various embodiments, user interaction logs 320(1) to 320(N) can be obtained by way of various web analytics platforms, such as Google Analytics, IBM Tealeaf®, etc. The user interaction logs 320(1) to 320(N) provide an insight as to what sequence of functions (e.g., screens) are typically taken by a user. In one embodiment, the information is filtered to only retain user interaction logs that have been deemed successful (e.g., those that result in a satisfactory completion of a transaction, such as a sale or resolution of an issue). Typically, a good design is one where a user is not surprised by the content of the subsequent screen, which may be indicated by the likelihood that a user would hit a "return" button to go back to the prior screen, aborts an interaction altogether, selects a help feature, and the like. In one embodiment, there is an expected time or time range for a user to spend on a screen. If the time spent on a screen exceeds a predetermined limit, it may be indicative of a poor design. In some scenarios, the longer a user spends time on a page, the better the UX design may be. Accordingly, the magnitude of time between an expected time versus an actual time spent may be indicative of an effectiveness of a transition from one screen to another.

The combination of the weighted flow graph 310 and the user interaction logs 320(1) to 320(N) provides a path 330(1) to 330(N). The path can then be used in the context of a training of a sequential model 340. For example, long short-term memory (LS™) can be used, which uses an artificial recurrent neural network (RNN) architecture for deep learning. This trained model 340 can then be used to evaluate new UX designs for their effectiveness.

Upon creating a trained model 340, it can be used in different levels of evaluating new UX designs for their effectiveness. In one aspect, the UX design evaluation discussed herein may involve three levels of evaluation of a UX design to provide a confidence score thereof, including (i) UI object evaluation, (ii) UI screen pair transition logic evaluation, and (iii) sequential UX flow evaluation. Each of these evaluations is discussed in detail below.

Figure 4:
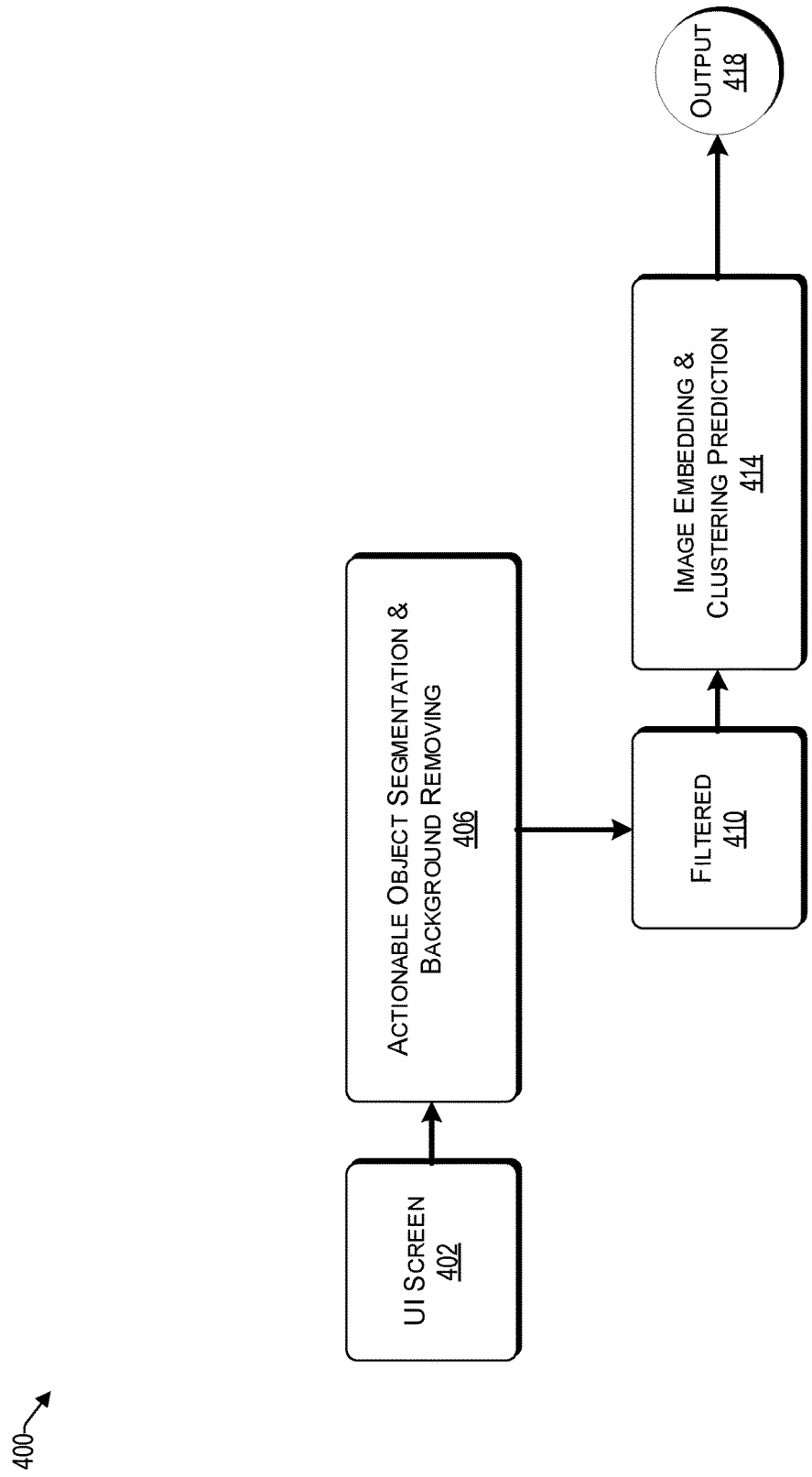
FIG. 4 is a functional block diagram of a user interface object evaluation, consistent with an illustrative embodiment.

Reference now is made to FIG. 4, which is a functional block diagram of a UI object evaluation by the UX design evaluation engine. The goal of the UI object evaluation 400 is to evaluate the recognizability of the function theme for the input UI screen 402. Stated differently, the object evaluation 400 determines to which cluster a UI screen belongs. To that end, the UX engine identifies actional objects by way of segmentation 406. Objects that are deemed to be the background are removed from the analysis. Accordingly, a filtered UI screen is provided 410 that does not include any background information.

Image embedding and clustering prediction is performed 414 to determine to which cluster each object in the UI screen belongs to. As used herein, a cluster is a bin that characterizes a function. In one embodiment, for each actionable object, the output 418 is a cluster node with a corresponding confidence score, sometimes referred to herein as a confidence score. For example, the higher the confidence score, the more likely the actionable object belongs to that cluster. If the confidence score is below a predetermined threshold, then the actionable item is deemed unrecognizable. For example, an actionable item being unrecognizable may indicate that the UI design may not be recognizable by users. In this regard, the UX design evaluation engine can send a notification (e.g., warning) to the relevant UX design developer.

If the confidence score is at or above a predetermined threshold, sometimes referred to herein as a dominant confidence score, the screen having the one or more actionable items is clustered accordingly.

Figure 5:
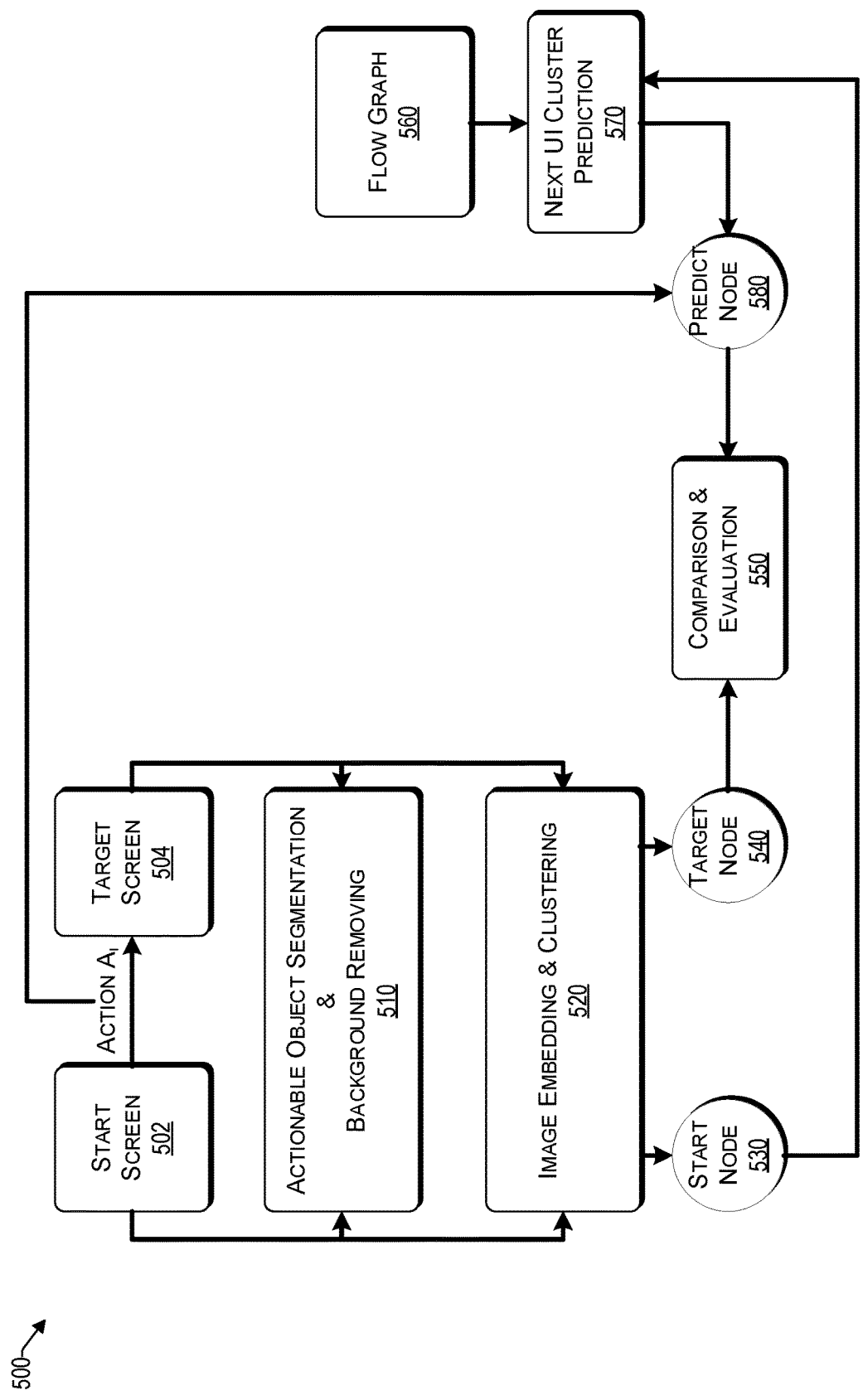
FIG. 5 is a conceptual block diagram of a user interface screen pair transition logic evaluation, consistent with an illustrative embodiment.

Reference now is made to FIG. 5, which is a conceptual block diagram 500 of a UI pair transition logic evaluation, consistent with an illustrative embodiment. More particularly, block diagram 500 explains how the transition from one screen (e.g., start screen 502) to a subsequent screen (e.g., target screen 504) is evaluated by the UX design evaluation engine 103. At block 510, for each screen 502 and 504 in the transition, actionable object segmentation is performed, as well as background removal, as explained above. At block 520, image embedding and clustering is performed for each screen 502 and 504 in the transition. There is a prediction module, represented by block 570, which is configured to determine (i.e., predict) the next node (i.e., screen) 580 based on the flow graph information 560 and the start node 530. These two nodes are then compared at block 550. In one embodiment, if these nodes are deemed to be not identical by the comparison (e.g., have a confidence score that is below a predetermined threshold), the transition between the screens is deemed to be ineffective. This process can continue for each pair of transitions between a start screen and the target screen 504. In this way, a fine granularity of evaluation of a UX design can be provided and the UX design developer can focus on the transitions that have a low confidence score.

For example, the Action Ai may be used to help predict the next node given the start node. Consider for example a designer designing two pages (A, B). By click of a button (i.e., Action Ai), the page can transition to page B from A (i.e., A→B), where A is the start screen, and B is the target screen. The system discussed herein can evaluate if the transition is "good" (e.g., user friendly) or "bad" (e.g., beyond users' expectation.) To that end, in one embodiment, the system firstly predicts clustering nodes for A and B, respectively, (e.g., based on block 414 of FIG. 4.). The system can then get determine a corresponding start node and a target node.

Then, the start node and the Action Ai can be used as inputs to the graph model to predict the next node. For example, in the graph, the edge indicates the transition triggered by a specific action. Accordingly, given the start node and the Action Ai, the next node (i.e., predict node) can be determined in the graph.

Next, the predict node is compared to the target node 550 to see if they are substantially similar. If they are substantially similar, it is indicative that the transition logic design is "good" and thus widely adopted in existing UX designs.

Figure 6:
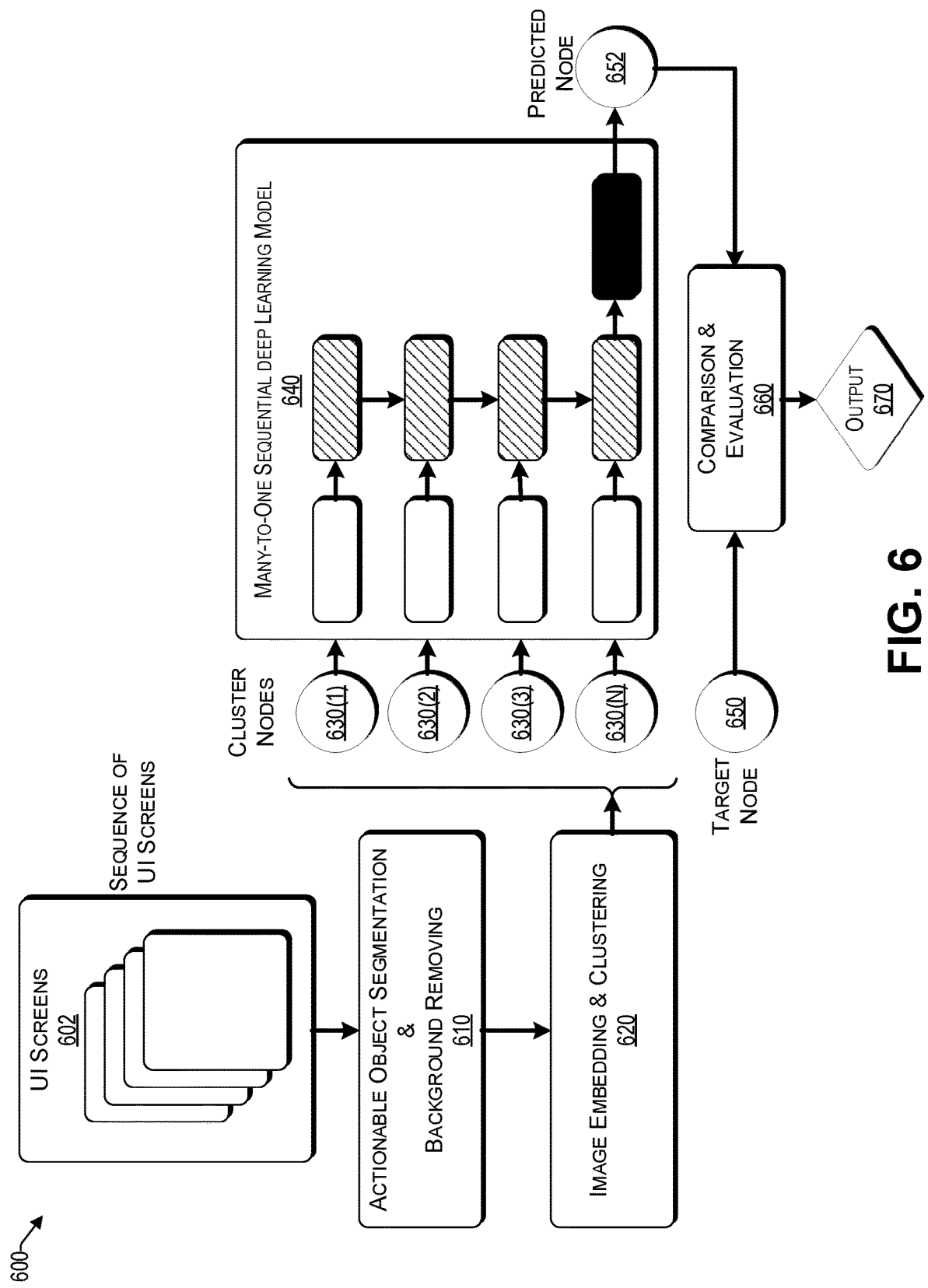
FIG. 6 is a conceptual block diagram of a user experience design flow evaluation, consistent with an illustrative embodiment.

FIG. 6 is a conceptual block diagram 600 of a UX design flow evaluation, consistent with an illustrative embodiment. Block 602 represents a sequence of user interface screens that are received by the UX design evaluation engine 103 of FIG. 1. At block 610, for each of the user interface screens 602, object segmentation is performed. Further the background objects are removed.

At block 620, image embedding and clustering is performed, thereby assigning each node (i.e., UI screen) to a corresponding cluster 630(1) to 630(1). For example, the first cluster node 630(1) may be a login screen, the second cluster node 630(2) can be a search screen, the third cluster node 630(3) can relate to a screen where a user can add products into a shopping bin, and the last cluster node 630(N) may be providing payment information.

Based on the given combination of the path 630(1) to 630(N), the target node 650, after the sequence of clusters 630(1) to 630(N), may be a checkout screen. Accordingly, unlike the approach of discussed in the context of FIG. 5, which focuses on a start screen and a target screen, the path 630(1) to 630(N) provides additional context to the UX design. Stated differently, instead of only analyzing an immediately previous screen, the approach of FIG. 6 provides a contextual overview of the path used in a UX design to arrive at a target node.

A learning model 640 is used to predict the next node 652, which is then compared to the target node 650 of the subject UX design product. In one embodiment, a many to one sequential deep learning model is used to provide the predicted node 652, based on the path of the cluster of nodes 630(1) to 630(N). Based on the comparison, the output 670 then indicates whether the UX design is successful.

Example Processes

Figure 7:
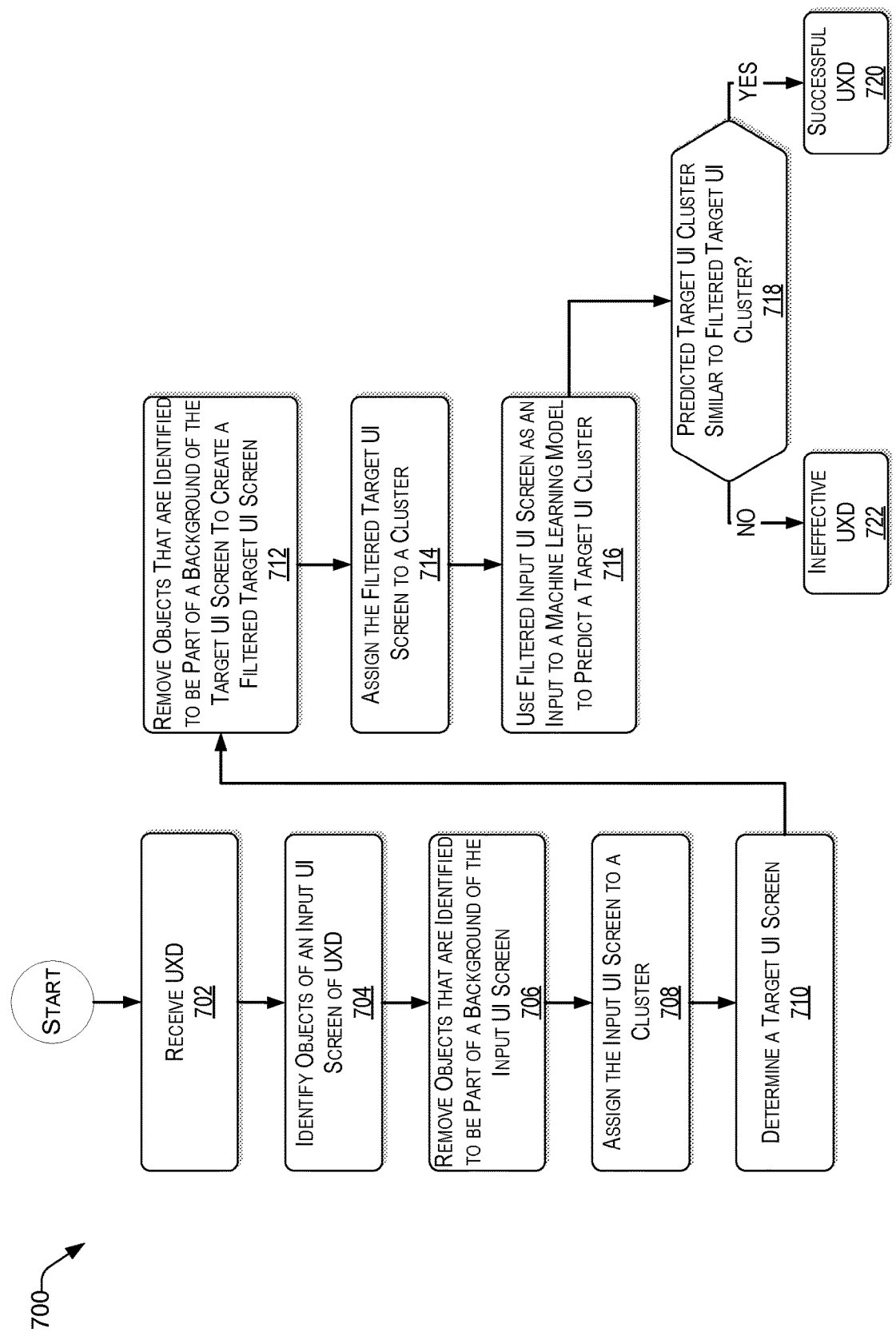
FIG. 7 presents an illustrative process related to evaluating a user experience design by way of analyzing screen transitions, consistent with an illustrative embodiment.
Figure 8:
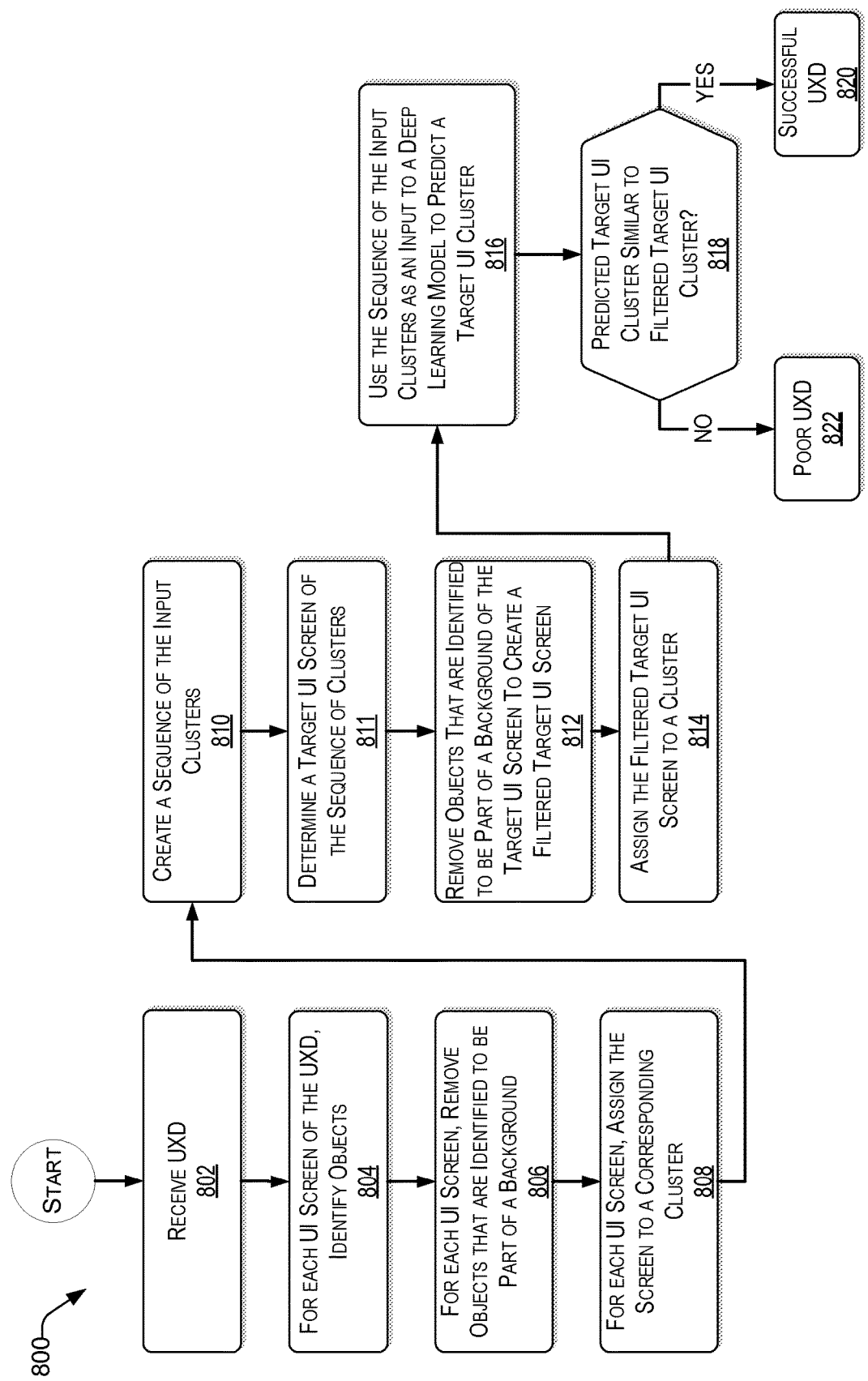
FIG. 8 is an example process flow of an evaluation of a quality of a user experience design based on an evaluation of a sequence of clusters, consistent with an illustrative embodiment.

With the foregoing overview of the example architecture 100 and conceptual block diagrams 200 to 600, it may be helpful now to consider a high-level discussion of example processes. To that end, FIG. 7 presents an illustrative process related to evaluating a UX design by way of analyzing screen transitions, consistent with an illustrative embodiment. FIG. 8 presents an illustrative process related to evaluating a UX design by way of analyzing a sequence comprising a plurality of screen transitions, consistent with an illustrative embodiment. Processes 700 and 800 are illustrated as a collection of blocks, each in a logical flowchart, which represent sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process. For discussion purposes, the processes 700 and 800 are described with reference to the architecture 100 of FIG. 1.

At block 702 the UX design evaluation engine 103 on the design evaluation server 116 receives a user experience design 105 over a network 106. At block 704, the UX design evaluation engine 103 identifies objects of a UI screen of the UX design 105. At block 706, the UX design evaluation engine 103 removes all objects that are identified to be part of a background of the input UI screen to create a filtered input UI screen. At block 708, the UX design evaluation engine 103 assigns the filtered input UI screen to a cluster (e.g., a first cluster).

At block 710, the UX design evaluation engine 103 determines a target UI screen of the input screen. For example, the target UI screen can be determined by the action Ai that triggers a transition from the input UI screen of the UI screen to the target UI screen. An action Ai is an interaction with an actionable object of the UI screen.

At block 712, the UX design evaluation engine 103 removes all objects that are identified to be part of a background of the target UI screen (i.e., from the target UI screen) to create a filtered target UI cluster. At block 714, the UX design evaluation engine 103 assigns the target UI screen to a cluster (e.g., a second cluster). In various embodiments, (i) the identification and removal of the objects of the input UI screen, and (ii) the identification and removal of objects of the target UI screen, can be performed concurrently or sequentially. For example, all input UI to target UI screen pairs (e.g., triggered by a corresponding Ai action) are identified. Then, all objects are that are identified to be part of the background of the corresponding screens are removed concurrently.

At block 716, the UX design evaluation engine 103 uses the filtered input UI screen as an input to a deep learning model to predict a target UI cluster. By virtue of removing the background objects from the input and target UI screens, the computational complexity and memory resources of the computing device (e.g., design evaluation server 116) are reduced.

At block 718, the UX design evaluation engine 103 compares the predicted target UI cluster to the filtered target UI cluster. Upon determining that the filtered target UI cluster is similar to the predicted target UI cluster (i.e., "YES" at decision block 718), the process continues with block 720 where the UX design is classified as successful. However, upon determining that the filtered target UI cluster is not similar to the target UI screen (i.e., "NO" at decision block 718), the process continues with block 722, where the UX design is classified as ineffective. In one embodiment, the similarity between the filtered input UI screen and the target UI screen is based on a confidence score being at or above a predetermined threshold. Upon determining that the UX design is ineffective, a notification may be sent to the relevant UX design developer (e.g., 101(1)) to indicate that the UX design should be improved. In one embodiment, the UX design that is deemed to be ineffective is blocked from an audience (e.g., a group of users is prevented from being exposed to the UX design), thereby preventing ineffective UX design from being distributed.

While the process 700 is generally described for simplicity for a transition between an input UI screen and a target UI screen (e.g., A→B), it will be understood that all transitions between input UI screens and corresponding output screens can be performed as well (e.g., A→B; B→C; C→D; etc.). In various embodiments, the transitions between input UI screen and corresponding target UI screen can be evaluated concurrently, sequentially, or any combination thereof.

Reference now is made to FIG. 8, which is an example process flow of an evaluation of a quality of a UX design based on an evaluation of a sequence of clusters, consistent with an illustrative embodiment. At block 802 the UX design evaluation engine 103 receives a user experience design 105 over a network 106. At block 804, for each UI screen of the UX design 105, the UX design evaluation engine 103 identifies objects of the UI screen of the UX design 105. At block 806, for each UI screen, the UX design evaluation engine 103 removes all objects that are identified to be part of a background to create a filtered input UI screen. At block 808, for each filtered input UI screen, the UX design evaluation engine 103 assigns the input UI screen to a corresponding cluster.

At block 810, the UX design evaluation engine 103 creates a sequence of the input clusters. For example, the sequence of the cluster of nodes ($C_1, C_2, C_3, \ldots C_{m-1}, C_m$) is based on user interaction logs and the weighted flow graph.

At block 811, the UX design evaluation engine 103 determines a target UI screen of the input cluster. At block 812, the UX design evaluation engine 103 removes all objects that are identified to be part of a background of the target UI screen to create a filtered target UI cluster.

At block 814, the UX design evaluation engine 103 assigns the target UI screen to a cluster.

At block 816, the UX design evaluation engine 103 uses the sequence of the input clusters as an input to a deep learning model to predict a target UI cluster. For example, a sub sequence (e.g., first m−1 cluster nodes) of the cluster nodes ($C_1, C_2, C_3, \ldots C_{m-1}$) are used as inputs to a sequential deep learning model to predict the target cluster node $C'_m$. By virtue of removing the background objects from the input and target UI screens, the computational complexity and memory resources of the computing device (e.g., design evaluation server 116) are reduced.

At block 818, the UX design evaluation engine 103 compares the predicted target UI cluster to the filtered target UI cluster (e.g., $C'_m = C_m$). Upon determining that the filtered target UI cluster is similar to the predicted target UI cluster (i.e., "YES" at decision block 818), the process continues with block 820 where the UX design is classified as a successful design. However, upon determining that the filtered target UI cluster is not similar to the predicted target UI cluster (i.e., "NO" at decision block 818), the process continues with block 822, where the UX design is classified as a poor UX design. In one embodiment, the similarity between the filtered input UI cluster and the target UI screen is based on score being at or above a predetermined threshold.

Example Computer Platform

Figure 9:
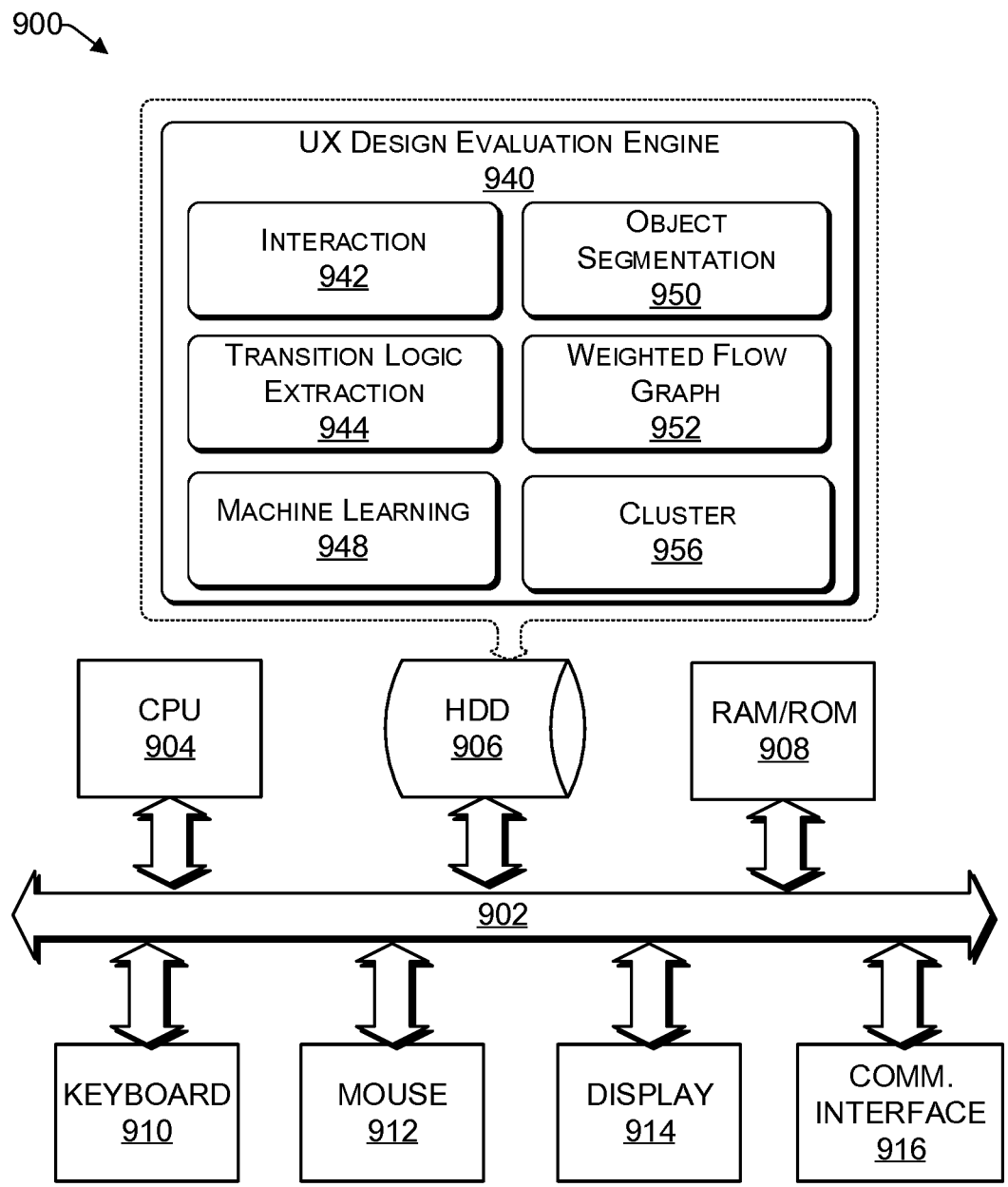
FIG. 9 provides a functional block diagram illustration of a computer hardware platform that can be used to implement a particularly configured computing device that can host a user experience design evaluation engine.

As discussed above, functions relating to automatically determining the quality of a UX design, can be performed with the use of one or more computing devices connected for data communication via wireless or wired communication, as shown in FIG. 1 and in accordance with the processes 700 and 800 of FIGS. 7 and 8. FIG. 9 provides a functional block diagram illustration of a computer hardware platform 900 that can be used to implement a particularly configured computing device that can host a UX design evaluation engine 940. In particular, FIG. 9 illustrates a network or host computer platform 900, as may be used to implement an appropriately configured server, such as the design evaluation server 116 of FIG. 1.

The computer platform 900 may include a central processing unit (CPU) 904, a hard disk drive (HDD) 906, random access memory (RAM) and/or read only memory (ROM) 908, a keyboard 910, a mouse 912, a display 914, and a communication interface 916, which are connected to a system bus 902.

In one embodiment, the HDD 906, has capabilities that include storing a program that can execute various processes, such as the UX design evaluation engine 940, in a manner described herein. The UX design evaluation engine 940 may have various modules configured to perform different functions. For example, there may be an interaction module 942 that is operative to receive electronic data from various sources, such as user interaction log 114 and historical database 112, as well as various UX design developers 101(1) to 101(N), as discussed herein.

In one embodiment, there is a transition logic extraction module 944 that is operative to determine transitions from one screen to another. For example, a UI screen may be a snapshot of a UI of a UX design at a specific time. The transition logic for a UI screen pair (e.g., UI1 to UI2) is the action that triggers the transition of the screen pair.

There may be a deep learning module 948 (sometimes referred to herein as a prediction module) operative to, during a preliminary phase (sometimes referred to as a training phase), learn from historical data of successful UX designs and user interaction logs to build a model that can be used to evaluate new UX designs, as discussed herein. There may be an object segmentation module 950 operative to detecting boundaries of actionable objects that include the UI items that can trigger a UI screen transition. In one embodiment the object segmentation module 950, additionally or alternatively, is configured to remove objects from a screen that are identified to be part of a background.

In one embodiment, there is a weighted flow graph module 952 operative to generate a weighted flow graph based on historical data and user interaction logs. Generating a weighted flow graph may include, for each screen, assigning the screen to a cluster based on the feature vectors identified in the screen. Graph nodes are added for each cluster. Directed edges are added based on transition logic between the graph nodes (e.g., two UI screens in two different clusters). In one embodiment, the weighted flow graph module 952 can update the edge weight based on the transition probability. There may be a cluster module 956 operative to cluster each screen to a corresponding cluster.

In one embodiment, a program, such as Apache™, can be stored for operating the system as a Web server. In one embodiment, the HDD 906 can store an executing application that includes one or more library software modules, such as those for the Java™ Runtime Environment program for realizing a JVM (Java™ virtual machine).

Example Cloud Platform

As discussed above, functions relating to managing the compliance of one or more client domains, may include a cloud 200 (see FIG. 1). It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
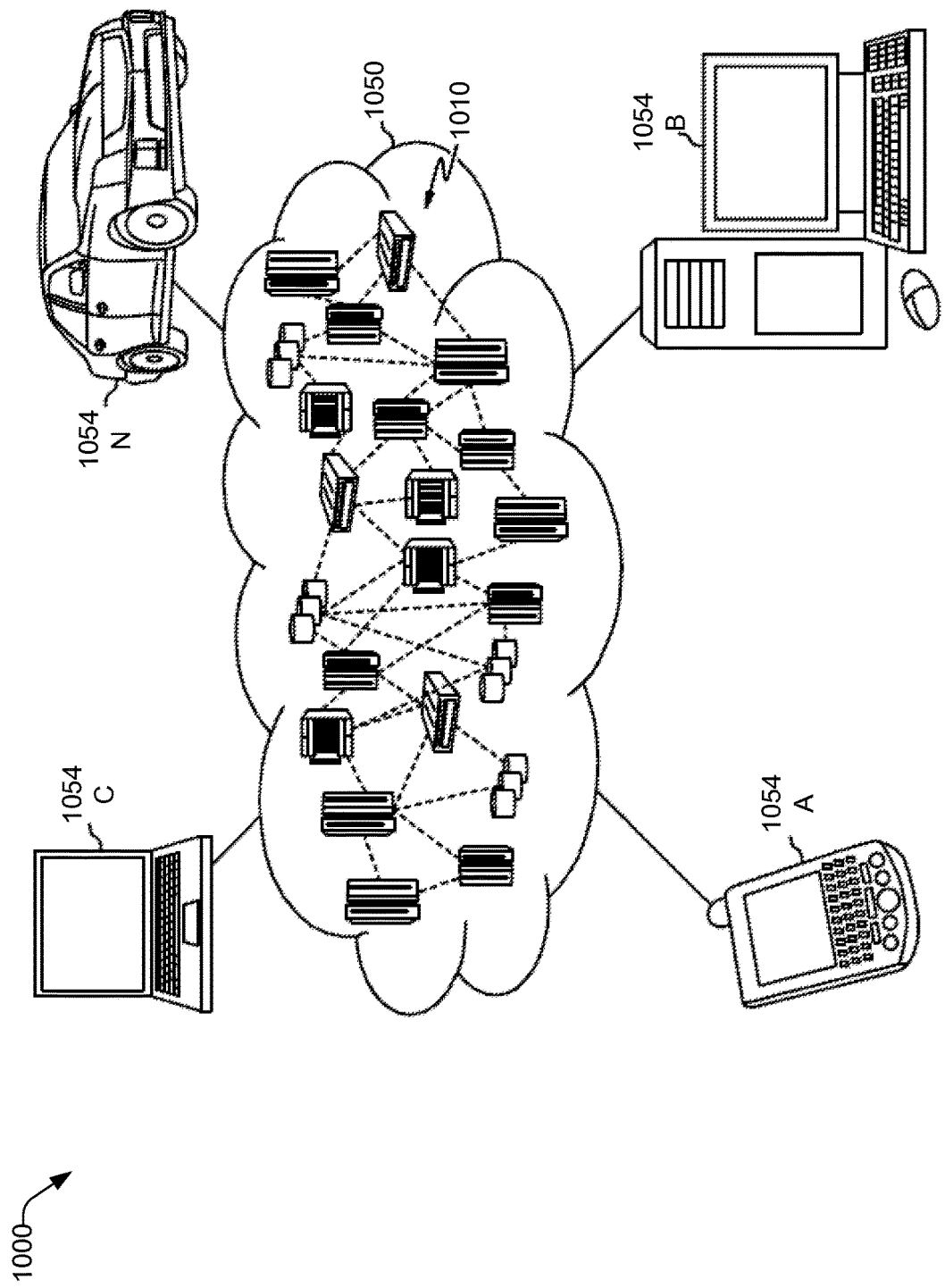
FIG. 10 depicts a cloud computing environment, consistent with an illustrative embodiment.

Referring now to FIG. 10, an illustrative cloud computing environment 1000 is depicted. As shown, cloud computing environment 1000 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
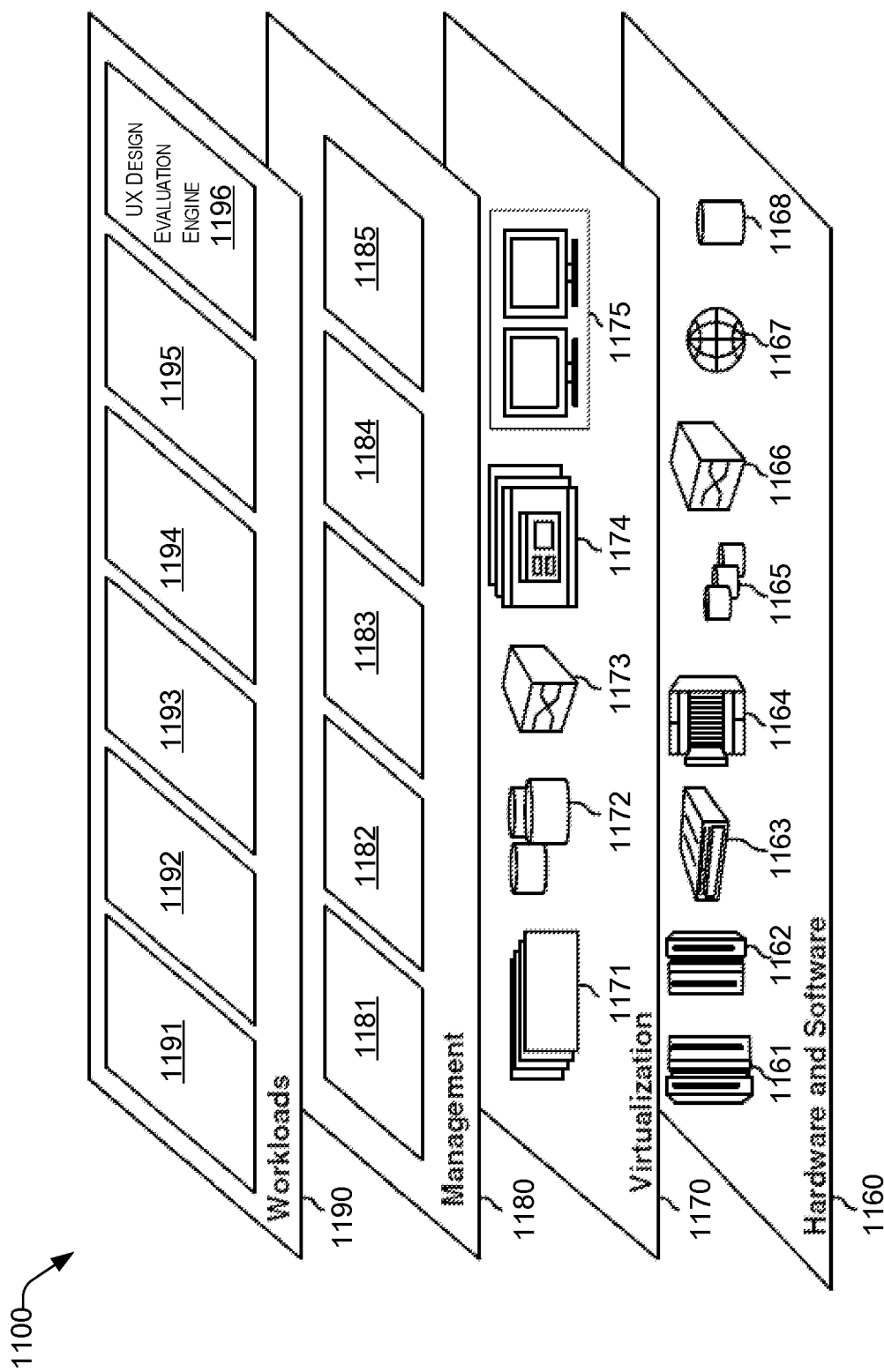
FIG. 11 depicts abstraction model layers, consistent with an illustrative embodiment.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the disclosure are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and evaluating the user interface design 1196, as discussed herein.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
a processor;
a network interface coupled to the processor to enable communication over a network;
a storage device coupled to the processor;
a user experience (UX) design evaluation engine code stored in the storage device, wherein an execution of the code by the processor configures the computing device to perform acts comprising:
receiving a UX design;
identifying objects of an input user interface (UI) screen of the UX design;
removing all objects that are identified to be part of a background of the input UI screen to create a filtered input UI screen;
assigning the filtered input UI screen to a cluster;
determining a target UI screen of the input screen;
removing all objects that are identified to be part of a background of the target UI screen, from the target UI screen, to create a filtered target UI screen;
assigning the filtered target UI screen to a cluster;
using the filtered input UI screen as an input to a deep learning model to predict a target UI cluster;
comparing the predicted target UI cluster to the filtered target UI cluster; and
upon determining that the filtered target UI cluster is similar to the predicted target UI cluster, classifying the UX design as being successful,
wherein the deep learning model is created by the computing device during a preliminary phase, comprising:
creating a weighted flow graph of clustering nodes based on historical data of successful UX designs;
receiving historical user interaction logs between users and UX designs;
combining the weighted flow graph and the user interaction logs to create paths; and
using the paths to train the deep learning model.

2. The computing device of claim 1, wherein the deep learning model is a sequential model.

3. The computing device of claim 1, wherein the similarity between the filtered target UI cluster and the predicted target UI cluster is based on a confidence score being at or above a predetermined threshold.

4. The computing device of claim 3, wherein the execution of the code by the processor further configures the computing device to perform acts comprising, upon determining that the confidence score is below the predetermined threshold, classifying the UX design as ineffective.

5. The computing device of claim 4, wherein the execution of the code by the processor further configures the computing device to perform acts comprising, upon determining that the UX design is ineffective, preventing the UX design from being available to an audience.

6. The computing device of claim 1, wherein the execution of the code by the processor further configures the computing device to perform acts comprising, performing a sequential UX flow evaluation of the UX design.

7. The computing device of claim 1, wherein:
the filtered input UI screen comprises a first feature vector;
the filtered target UI screen comprises a second feature vector; and
the comparison is based on a comparison of the first feature vector to the second feature vector.

8. The computing device of claim 1, wherein:
the deep learning model is a sequential model; and
long short-term memory (LSTM) is used by the sequential model.

9. The computing device of claim 1, wherein edges between the clustering nodes of the weighted flow graph are weighted based on a probability of transition between the clustering nodes.

10. A computing device comprising:
a processor;
a network interface coupled to the processor to enable communication over a network;
a storage device coupled to the processor;
a UX design evaluation engine code stored in the storage device, wherein an execution of the code by the processor configures the computing device to perform acts comprising:
receiving a user experience UX design comprising a sequence of user interface screens;
for each UI screen of the UX design:
identifying objects of the UI screen;
removing all objects that are identified to be part of a background of the UI screen to create a filtered input UI screen;
assigning the input UI screen to a cluster;
creating a sequence of the clusters;
determining a target UI screen of the sequence of clusters;
removing all objects that are identified to be part of a background of the target UI screen to create a filtered target UI screen;
assigning the filtered target UI screen to a cluster;
using the sequence of the clusters as an input to a deep learning model to predict a target UI cluster;
comparing the predicted target UI cluster to the filtered target UI cluster;
upon determining that the filtered target UI cluster is similar to the target UI screen, classifying the UX design as being successful,
wherein the deep learning model is created by the computing device during a preliminary phase, comprising:
creating a weighted flow graph of clustering nodes based on historical data of successful UX designs;
receiving historical user interaction logs between users and UX designs;
combining the weighted flow graph and the user interaction logs to create paths; and
using the paths to train the deep learning model.

11. The computing device of claim 10, wherein the deep learning model is a many to one sequential deep learning model.

12. The computing device of claim 10, wherein the similarity between the filtered target UI cluster and the predicted target UI cluster is based on a confidence score being at or above a predetermined threshold.

13. The computing device of claim 12, wherein the execution of the code by the processor further configures the computing device to perform acts comprising, upon determining that the confidence score is below the predetermined threshold, classifying the UX design as ineffective.

14. The computing device of claim 13, wherein the execution of the code by the processor further configures the computing device to perform acts comprising, upon determining that the UX design is ineffective, preventing the UX design from being available to an audience.

15. The computing device of claim 10, wherein:
the filtered input UI screen comprises a first feature vector;
the filtered target UI screen comprises a second feature vector; and
the comparison is based on a comparison of the first feature vector to the second feature vector.

16. A non-transitory computer readable storage medium tangibly embodying a computer readable program code having computer readable instructions that, when executed, causes a computer device to carry out a method of evaluating a user experience (UX) design, the method comprising:
receiving a UX design;
identifying objects of an input user interface (UI) screen of the UX design;
removing all objects that are identified to be part of a background of the input UI screen to create a filtered input UI screen;
assigning the input UI screen to a cluster;
determining a target UI screen of the input screen;
removing all objects that are identified to be part of a background of the target UI screen, from the target UI screen, to create a filtered target UI cluster;
assigning the target UI screen to a cluster;
using the filtered input UI screen as an input to a deep learning model to predict a target UI cluster;
comparing the predicted target UI cluster to the filtered target UI cluster based on the clustering; and
upon determining that the filtered target UI cluster is similar to the target UI screen, classifying the UX design as being successful,
wherein the deep learning model is created by a computing device during a preliminary phase, comprising:
creating a weighted flow graph of clustering nodes based on historical data of successful UX designs;
receiving historical user interaction logs between users and UX designs;
combining the weighted flow graph and the user interaction logs to create paths; and
using the paths to train the deep learning model.

17. The non-transitory computer readable storage medium of claim 16, wherein the deep learning model is a sequential model.

18. The non-transitory computer readable storage medium of claim 16, wherein the similarity between the filtered target UI cluster and the predicted target UI cluster is based on a confidence score being at or above a predetermined threshold.

19. The non-transitory computer readable storage medium of claim 16, wherein the execution of the code by the processor further configures the computing device to perform acts comprising, upon determining that the UX design is ineffective, preventing the UX design from being available to an audience.

\* \* \* \* \*